April 12, 1966 R. A. PODOLOFF 3,245,165
ATTACHING DEVICE FOR HOLDING AN OBJECT ON A SUPPORT
Filed June 18, 1965

INVENTOR.
ROBERT A. PODOLOFF
BY
Blair & Buckles
ATTORNEYS

United States Patent Office 3,245,165
Patented Apr. 12, 1966

3,245,165
ATTACHING DEVICE FOR HOLDING AN OBJECT ON A SUPPORT
Robert A. Podoloff, New Haven, Conn., assignor to Hancock Telecontrol Corporation, Old Greenwich, Conn.
Filed June 18, 1965, Ser. No. 465,006
1 Claim. (Cl. 40—129)

The present invention relates generally to attaching devices for securing an object to a support and, more specifically, to magnetic devices for attaching signs and the like to a ferrous support.

Certain advertising signs are frequently used temporarily in various different places to promote the products or services of the user and it is often desirable to have a sign that is easily attachable to and removable from different type supports and that does not mar or alter the supporting surface. For example, easily attachable and removable signs are useful for attaching signs to delivery vehicles when it is desired to advertise different products or services on different days or to readily replace the old advertising signs with new signs. Such signs are particularly advantageous when it is desired to temporarily secure a sign to a rented vehicle without any permanent alteration to the supporting surface or when the vehicle may be employed on limited access highways where commercial or vehicles bearing advertising matter are prohibited.

It is an object of this invention to provide a novel and improved device for securing an object to a support that is relatively inexpensive to manufacture and convenient to use.

Another object is to provide such a device for securing an object to a magnetically engageable support.

It is also an object to provide such a device which will not mar the supporting surface and which will provide firm engagement thereto for avoiding relative slippage.

Other objects and advantages will be readily apparent from the following detailed specification and claim and the attached drawing wherein:

Figure 1:
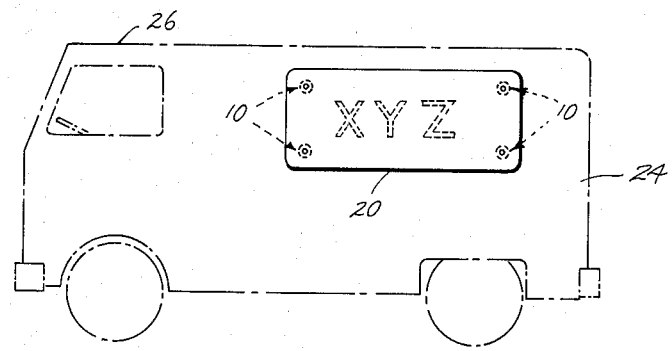
FIGURE 1 is a plan view of a sign mounted by devices embodying the present invention upon a truck and having advertising matter thereon, both illustrated in phantom line.

It has now been found that the foregoing objects and other advantages can readily be attained in an attaching device for securing an object to a support having a magnet with an aperture extending therethrough and a sleeve of resiliently deformable material releasably engaged with the magnet. The sleeve has a base portion covering one face of the magnet for contact with the support and a core portion extending from the base portion within the magnet aperture. A peripheral portion of the sleeve extends from the base portion about the periphery of the magnet and has an inwardly extending flexible lip at the outer end thereof overlying the peripheral portion of the other face of the magnet. A connector is seated in the core portion for securing the device to the object to be supported.

Thus, this invention provides an attaching device for holding an object on a support and is composed of an annular magnet releasably retained by an integrally formed sleeve of resiliently deformable material which also retains the connector for the object to be supported. The portion of the sleeve disposed within the bore of the annular magnet may form a relatively rigid core portion for use in seating the connector for mounting the device on the object to be supported and the base portion of the sleeve is interposed between the magnet and the support to prevent the surface of support from being defaced and prevent the device from sliding by the friction of the sleeve between the magnet and the support surface. The sleeve is readily and firmly releasably secured to the magnet by a peripheral portion of the sleeve that surrounds the outer circumference and engages one face of the magnet with a flexible lip. Thus a resilient integrally formed sleeve, that may be easily and economically manufactured, releasably retains the magnet and is conveniently removable therefrom and provides a relatively stiff core portion for seating the connector for attachment to the object to be supported.

One embodiment of this invention utilizes an annular magnet and a generally annular sleeve of resiliently deformable material for attaching an advertising sign to a magnetically engageable support of ferrous metal or the like. In this embodiment, the annular magnet has a cylindrically shaped bore formed in the center thereof and an outer surface forming a cylinder in axial alignment with the bore, and the resilient sleeve has a relatively rigid core portion seated snugly within the bore of the magnet.

Another embodiment of this invention for attaching a sign to supports similar to the one described above utilizes an annular magnet and a sleeve of resilient material that has a base portion having a concave outer surface forming a suction cup for additional attachment of the device to the surface of magnetically engageable supports. The bore of this magnet is of larger width than the core of the sleeve and the outer surface of the base portion of the sleeve adjacent the core provides a concavity that may be deformed. By applying downward pressure on the sign, the core of the sleeve connected to the sign is depressed toward the supporting surface and flattens the concavity of the base portion of the sleeve, whereby the air entrapped therein is expelled and a vacuum is created when the downward pressure on the sign is released and the base portion tends to return to its normal concave shape. When an outward force is applied to the sign tending to disengage the attaching device from a support surface, the vacuum is increased as the base portion of the sleeve is moved upwardly by core of the sleeve connected to the sign whereby the attaching force of the device is increased. Thus a device, that may be attached to magnetically engageable supports by the attaching force of both the magnet and the vacuum cup portion of the sleeve, may be inexpensively manufactured and easily assembled by providing an integral sleeve portion of resilient material that has a base portion in the shape of a vacuum cup.

Figure 3:
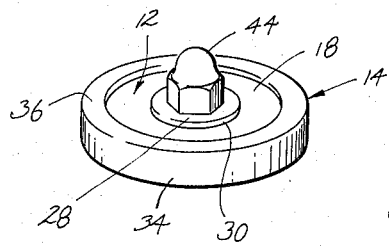
FIGURE 3 is a perspective view of the attaching device of FIGURE 1 removed from the sign and to a greatly enlarged scale.
Figure 2:
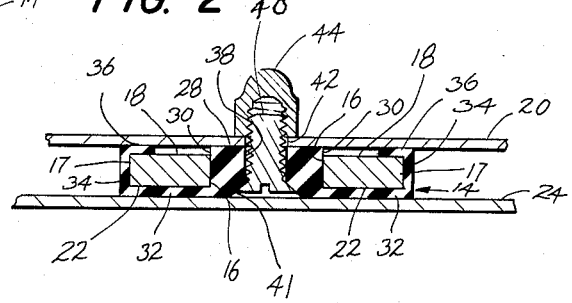
FIGURE 2 is a fragmentary cross sectional view of the sign and attaching device of FIGURE 1 to a greatly enlarged scale.

Referring now in detail to the attached drawing, FIGURES 1–3 illustrate one embodiment of the present invention wherein an attaching device generally designated by the numeral 10 has an annular magnet generally designated by the numeral 12 partially surrounded and releasably retained by a resiliently deformable sleeve of generally annular shape generally designated by the numeral 14. The annular magnet 12 has an inner surface forming a cylindrically shaped aperture or bore 16 and the peripheral or outer surface 17 forming a cylinder in axial alignment with the bore 16. The top face or surface 18 of the magnet 12 is partially covered by the sleeve 14 and is disposed adjacent to an object to be supported such as the sign 20. The bottom face or surface 22 of the magnet 12 is located adjacent the support surface 24 which is capable of being magnetically engaged by the magnet 12, such as the side of vehicle 26 illustrated in FIGURE 1, and is covered by an interposed portion of the sleeve 14 which lies between the bottom surface 22 and the support surface 24.

The sleeve 14 is integrally formed of resilient material such as rubber and the like and has a relatively rigid core portion 28 which is cylindrical in shape and occupies the entire bore 16 formed by inner surface of the magnet 12 and has a free end portion 30 that protrudes out of the bore 16 and resiliently contacts sign 20 thereby protecting it from being scratched by magnet 12. At the opposite end of bore 16, the sleeve 14 has a base portion 32 that is contiguous with the bottom surface 22 of the magnet 12 and frictionally engages the support surface 24 whereby the magnet 12 and sign 20 are prevented from slipping and the support surface 24 is protected from being defaced by the magnet. The sleeve 14 is releasably secured to the magnet 12 by the peripheral portion 34 that extends from the base portion 32 and surrounds the outer surface 17 of the magnet 12 and has a flexible lip portion 36 at the upper end thereof which extends over the peripheral portion of the top surface 18 and is interposed between the sign 20 and the magnet 12. The attaching device is accordingly designed so that the sleeve 14 and magnet 12 may be easily and conveniently assembled by inserting the core portion 28 of the sleeve 14 in the bore 16 of the magnet 12 and by flexing the flexible lip portion 36 into engagement over the top surface 18 of the magnet 12 whereby the magnet 12 is releasably retained in and partially surrounded by sleeve 14.

The core portion 28 of the sleeve 14 has an aperture 38 with a bolt 40 seated therein and having its shank extending outwardly of the aperture 28 and through a suitable hole 42 in the sign 20 for engagement with a nut 44 which secures the attaching device 10 to the sign 20. The aperture 38 has a countersunk portion 41 of sufficient dimension to seat the head of the bolt 40 and to provide a recess or space between the head of the bolt 40 and the bottom surface of the base portion 32 so that only the resilient material of the sleeve 14 comes in contact with the support surface 24.

Figure 4:
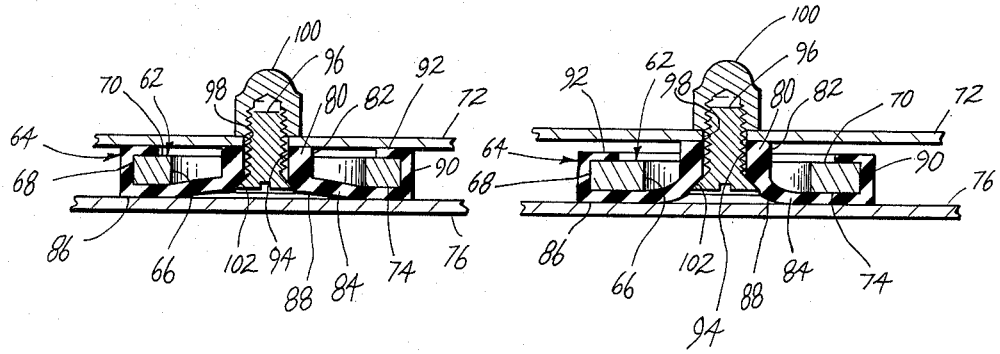
FIGURE 4 is a fragmentary cross sectional view of a sign mounted on a supporting surface by another embodiment of the attaching device.
Figure 5:
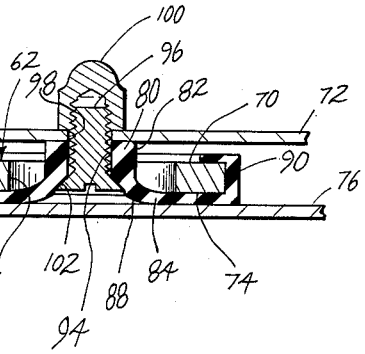
FIGURE 5 is a view similar to FIGURE 4 but with the core of the device raised as by detaching movement of the advertising sign.

FIGURES 4 and 5 illustrate another embodiment of this invention wherein an attaching device has an annular magnet generally designated by the numeral 62 partially surrounded and retained by a resilient rubber sleeve of generally annular shape generally designated by the numeral 64. The inner surface of the annular magnet 62 forms a cylindrically shaped bore 66 and the peripheral or outer surface 68 forms a cylinder in axial alignment with the bore 66. The top face or surface 70 of the magnet 62 is partially covered by the lip portion 92 on the peripheral portion 90 of the sleeve 64 and is disposed adjacent to an object to be supported such as the sign 72. The bottom face or surface 74 of the magnet 62 is located adjacent a support surface 76 of magnetically engageable material and is covered by the base portion 84 of the sleeve 64 which lies between the bottom surface 74 and the support surface 76. The resilient rubber sleeve 64 also has a core portion 80 which is cylindrical in shape and of considerably smaller diameter than the bore 66 formed by the inner surface of magnet 62 in which it extends coaxially. The core portion 80 also has a free end portion 82 that extends outwardly of the bore 66 and resiliently contacts sign 72.

In this embodiment, the outer surface 86 of the base portion 84 of the sleeve 64 is configured to provide a concavity 88 which forms a vacuum cup for engagement with the support surface 76. Accordingly, this embodiment is designed so that device 60 attaches to magnetically engageable surface by the attaching force of both the magnet 62 and the vacuum cup portion of sleeve 64 and may be economically and conveniently manufactured by forming a sleeve having a core portion 80 of a lesser diameter than the bore 66 of the magnet 62 and having a concavity 88 on the under surface 86 of the base portion 84 of the sleeve 64.

The core portion 80 of the sleeve 64 has an aperture 94 with a bolt 96 seated therein and having its shank extending outwardly of the aperture 94 and through a suitable hole 98 in the sign 72 for engagement with a nut 100 which secures the attaching device 60 to the sign 72. The aperture 94 has a countersunk portion 102 of sufficient dimension to seat the head of bolt 96 and to provide a recess or space between the head of the bolt 96 and the surface of concavity 88 so that only the rubber material of the sleeve 64 comes in contact with the support surface 76.

Thus a novel and improved device is provided for securing an object to a magnetically engageable support that has a resilient sleeve which is relatively inexpensive to manufacture and may be conveniently fitted on an annular magnet. The resilient sleeve has a base portion which protects the supporting surface from being defaced by the magnet and prevents the device from slipping thereon. The device is prevented from slipping by friction between the base portion and the support surface or by a vacuum cup portion formed in the base portion which prevents the device from slipping and provides additional attachment to the support.

Having thus described the invention, I claim:

An attaching device for securing an object to a support comprising an annular magnet having a cylindrical shaped bore extending therethrough; an annular sleeve of resiliently deformable material releasably engaged with said magnet, said sleeve having a base portion covering one face of said magnet for contact with the support, a core portion extending from said base portion within said magnet bore, said core portion having a substantially smaller diameter than said bore, and a peripheral portion extending from said base portion about the periphery of said magnet with an inwardly extending flexible lip at the outer end thereof overlying the peripheral portion of the other face of said magnet, said base portion providing a concave outer surface about said core portion forming a vacuum cup for engaging the support; and a connector seated in said core portion.

References Cited by the Examiner

UNITED STATES PATENTS

| | | | |
|---|---|---|---|
| 1,598,559 | 8/1926 | Cohen | 248—206 |
| 2,977,082 | 3/1961 | Harris | 40—142 X |
| 3,148,856 | 9/1964 | Orlando | 248—206 |

EUGENE R. CAPOZIO, *Primary Examiner.*

SHELDON M. BENDER, *Assistant Examiner.*